(12) United States Patent
Nohara et al.

(10) Patent No.: US 12,305,054 B2
(45) Date of Patent: May 20, 2025

(54) CONDUCTIVE PASTE, CONDUCTIVE FILM, AND METHOD FOR PRODUCING CONDUCTIVE FILM

(71) Applicant: Nippon Telegraph and Telephone Corporation, Tokyo (JP)

(72) Inventors: Masaya Nohara, Musashino (JP); Hironobu Minowa, Musashino (JP); Mikayo Iwata, Musashino (JP); Hiroaki Taguchi, Musashino (JP); Takeshi Komatsu, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 363 days.

(21) Appl. No.: 17/604,713

(22) PCT Filed: May 29, 2019

(86) PCT No.: PCT/JP2019/021303
§ 371 (c)(1),
(2) Date: Oct. 18, 2021

(87) PCT Pub. No.: WO2020/240733
PCT Pub. Date: Dec. 3, 2020

(65) Prior Publication Data
US 2022/0195229 A1    Jun. 23, 2022

(51) Int. Cl.
*C09D 11/52* (2014.01)
*B41M 3/00* (2006.01)
(Continued)

(52) U.S. Cl.
CPC ............ *C09D 11/52* (2013.01); *B41M 3/006* (2013.01); *B41M 7/009* (2013.01);
(Continued)

(58) Field of Classification Search
CPC ..... B41M 3/006; B41M 7/009; C09D 11/037; C09D 11/104; C09D 11/52; H01B 1/24; H01B 5/14
See application file for complete search history.

(56) References Cited

U.S. PATENT DOCUMENTS

2016/0372230 A1*  12/2016  Imahashi ................ C08K 3/08
2017/0194650 A1*  7/2017   Mihara ................... H01B 1/04
2021/0163293 A1   6/2021   Nohara et al.

FOREIGN PATENT DOCUMENTS

JP     2003082535 A  *  3/2003  ............ B82Y 30/00
JP     2013-93518 A     5/2013
(Continued)

OTHER PUBLICATIONS

Machine Translation of JP 2003-082535A (Year: 2003).*
(Continued)

*Primary Examiner* — Gerard Higgins
*Assistant Examiner* — Sathavaram I Reddy
(74) *Attorney, Agent, or Firm* — Workman Nydegger (57) ABSTRACT

Provided is a technique for a conductive paste having high conductivity and low cost. The conductive paste includes a conductive filler, a polymer, and a solvent, wherein the conductive filler includes co-continuous fibrous carbon having a three-dimensional network structure in which carbon is branched.

3 Claims, 4 Drawing Sheets

(51) Int. Cl.
  *B41M 7/00*    (2006.01)
  *C09D 11/037*  (2014.01)
  *C09D 11/104*  (2014.01)
  *H01B 1/24*    (2006.01)
  *H01B 5/14*    (2006.01)

(52) U.S. Cl.
  CPC .......... *C09D 11/037* (2013.01); *C09D 11/104* (2013.01); *H01B 1/24* (2013.01); *H01B 5/14* (2013.01)

(56) References Cited

FOREIGN PATENT DOCUMENTS

WO    2016/009935 A1    1/2016
WO    2019/026404 A1    2/2019

OTHER PUBLICATIONS

S. Cui et al., *Characterization of Multiwall Carbon Nanotubes and Influence of Surfactant in the Nanocomposite Processing*, Carbon, vol. 41, 2003, pp. 797-809.

Jing Kong et al., *Chemical Vapor Deposition of Methane for Single-Walled Carbon Nanotubes*, Chemical Physics Letter, vol. 292, 1998, pp. 567-574.

Sumio Iijima et al., *Single-Shell Carbon Nanotubes of 1-nm Diameter*, Nature, vol. 363, Jun. 17, 1993, pp. 603-605.

\* cited by examiner

CONDUCTIVE PASTE, CONDUCTIVE FILM, AND METHOD FOR PRODUCING CONDUCTIVE FILM

TECHNICAL FIELD

The present invention relates to a conductive paste, a conductive film, and a method for producing a conductive film.

BACKGROUND ART

In the related art, conductive pastes have been used in batteries, fuel cells, capacitors, electronic components, and the like to form electrodes, circuits, electromagnetic wave shields, and the like. Some of these conductive pastes use metals and carbon as conductive fillers.

However, when a metal such as silver, copper, or nickel is used in a conductive filler, the application of a voltage under high humidity environmental conditions may cause the ionized metal to move (ion migration) between the electrodes and short circuit. Further, an oxidation reaction is likely to occur and the desired conductivity cannot be exhibited. Further, when gold and silver are used as a conductive filler, there is a problem in terms of cost because they are very expensive.

From these facts, a conductive paste including carbon as a conductive filler is considered to be effective.

CITATION LIST

Non-Patent Literature

Non-Patent Literature 1: Carbon Vol. 41, pp. 797-809 (2003)
Non-Patent Literature 2: Nature Vol. 363, pp. 603-605 (1993)
Non-Patent Literature 3: Chemical Physics Letters Vol. 292, pp. 567-574 (1998)

SUMMARY OF THE INVENTION

Technical Problem

Examples of a conductive paste using carbon as such a conductive filler include those using carbon nanotubes, fullerenes, graphene, graphite, and amorphous carbon as carbon. However, spherical or scaly fullerenes, graphene, graphite, and amorphous carbon have difficulty in maintaining an electrically conductive path between conductive fillers when printed, and cannot exhibit the desired conductivity.

The carbon nanotubes, which are fibrous, can be expected to have high conductivity based on their specific structure, but in order to effectively exploit the characteristics of the fiber, the carbon nanotubes are preferably uniformly dispersed without aggregation. However, general carbon nanotubes have a strong cohesive force and form bundle-like aggregates called bundles, and thus it is difficult to disperse them uniformly.

Various attempts have been made to improve the dispersibility of carbon nanotubes with respect to the dispersion medium. For example, a method using a dispersant (Non-Patent Literature 1) and a method of radiating ultrasonic waves (Non-Patent Literature 1) can be mentioned. In the method using a dispersant, the dispersant remains even after printing the conductive paste, which causes a decrease in conductivity. Further, in the method of radiating ultrasonic waves, the aggregation of carbon nanotubes starts again when the radiation is completed.

For example, an electrode discharge method, a vapor phase growth method, and a laser method are known (Non-Patent Literatures 2 and 3) as methods for producing carbon nanofibers. However, it is acknowledged that these methods generally produce low yields of carbon nanotubes and are costly.

Therefore, obtaining a highly conductive and inexpensive conductive paste is an important issue for expanding applications.

The present invention has been made in view of this problem, and an object of the present invention is to provide a technique relating to a highly conductive and inexpensive conductive paste.

Means for Solving the Problem

One aspect of the present invention is a conductive paste including a conductive filler, a polymer, and a solvent, the conductive filler including co-continuous fibrous carbon having a three-dimensional network structure in which carbon is branched.

One aspect of the present invention is a conductive film obtained by printing the above conductive paste on a substrate and then drying it.

One aspect of the present invention is a method for producing a conductive film, including crushing co-continuous fibrous carbon having a three-dimensional network structure in which carbon is branched; mixing the crushed co-continuous fibrous carbon, a polymer, and a solvent to obtain a conductive paste; printing the conductive paste on a substrate; and drying the conductive paste to remove the solvent to obtain the conductive film.

Effects of the Invention

According to the present invention, it is possible to provide a technique relating to a highly conductive and inexpensive conductive paste.

DESCRIPTION OF EMBODIMENTS

Hereinafter, an embodiment of the present invention will be described with reference to the drawings.

First Embodiment

Figure 1:
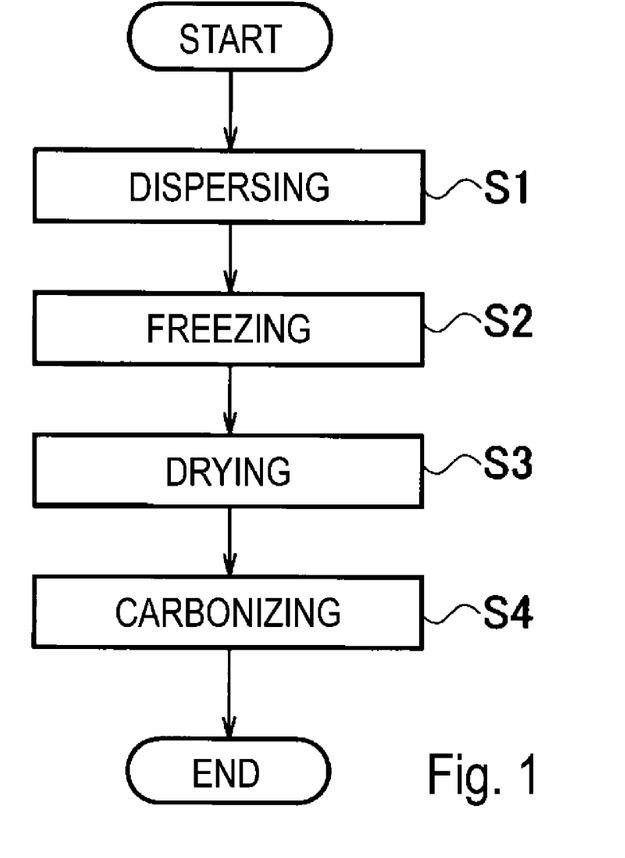
FIG. 1 is a flowchart depicting a method for producing co-continuous fibrous carbon according to a first embodiment of the present invention.

FIG. 1 is a flowchart depicting a method for producing co-continuous fibrous carbon according to a first embodiment of the present invention.

The method for producing co-continuous fibrous carbon of the present embodiment includes a dispersing step (step S1), a freezing step (step S2), a drying step (step S3), and a carbonizing step (step S4). This production method requires a cellulose nanofiber dispersion liquid.

The raw material is not particularly limited as long as it is a cellulose nanofiber. Examples of the cellulose nanofiber include wood-derived, pulp-derived, crustacean-derived, bacterial-derived, food-derived, plant-derived, and other biologically derived ones. In the present embodiment, any one of these cellulose nanofibers may be used, or a mixture of two or more of these cellulose nanofibers may be used.

The form of the cellulose nanofibers in the cellulose nanofiber dispersion liquid is preferably a dispersed form. Therefore, the production process depicted in FIG. 1 includes a dispersing step (step S1), but the dispersing step (step S1) may be omitted. That is, when a dispersion liquid in which cellulose nanofibers are already dispersed is used, the step is not necessary.

In the dispersing step, the cellulose nanofibers contained in the cellulose nanofiber dispersion liquid are dispersed. The dispersion medium may be an aqueous one such as (H2O), or an organic one such as carboxylic acid, methanol (CH3OH), ethanol (C2H5OH), propanol (C3H7OH), n-butanol, isobutanol, n-butylamine, dodecane, unsaturated fatty acids, ethylene glycol, heptane, hexadecane, isoamyl alcohol, octanol, isopropanol, acetone, or glycerin. Two or more of these media may be used in combination.

For dispersing the cellulose nanofibers, for example, a homogenizer, an ultrasonic cleaner, an ultrasonic homogenizer, a magnetic stirrer, a stirrer, or a shaker may be used.

The solid content concentration of the cellulose nanofibers in the cellulose nanofiber dispersion liquid is preferably 0.001 to 80% by mass, and more preferably 0.01 to 30% by mass. This is because when the solid content concentration is too low, a network of cellulose nanofibers cannot be formed, and it becomes difficult to form a co-continuous structure of carbon in the carbonizing step (step S4) described later. In addition, if the solid content concentration is too high, the cellulose nanofibers will aggregate in the freezing step (step S2) described later, and, in the carbonizing step (step S4), the sintering of cellulose proceeds, and formation of a fibrous structure becomes difficult.

In the freezing step, a dispersion liquid containing cellulose nanofibers is frozen to obtain a frozen product (step S2). This step is performed by, for example, placing the cellulose nanofiber dispersion liquid in an appropriate container such as a test tube, and freezing the cellulose nanofibers in the test tube by cooling the surroundings of the test tube in a coolant such as liquid nitrogen.

The method for freezing is not particularly limited as long as the dispersion medium of the dispersion liquid can be cooled below the freezing point, and cooling in a freezer or the like may be applied. By freezing the cellulose nanofiber dispersion liquid, the dispersion medium loses its fluidity, the cellulose nanofibers which are dispersoids are fixed, and a three-dimensional network structure is constructed.

In the drying step, the frozen body frozen in the freezing step is dried in a vacuum to obtain a dried body (step S3). In this step, the frozen dispersion medium is sublimated from the solid state. For example, the drying step is carried out by placing the obtained frozen product in a suitable container such as a flask and evacuating the inside of the container. By placing the frozen body in a vacuum atmosphere, the sublimation point of the dispersion medium decreases, and thus even a substance that does not sublimate under normal pressure can be sublimated.

The degree of vacuum in the drying step varies depending on the dispersion medium used, but is not particularly limited as long as the degree of vacuum is adjusted such that the dispersion medium sublimates. For example, when water is used as the dispersion medium, it is necessary to set a degree of vacuum such that the pressure is 0.06 MPa or less, but drying takes time because heat is lost as latent heat of sublimation. Therefore, the degree of vacuum is preferably $1.0 \times 10^{-6}$ Pa to $1.0 \times 10^{-2}$ Pa. Further, heat may be applied using a heater or the like at the time of drying.

In the carbonizing step, the dried product dried in the drying step is heated and carbonized in an atmosphere that does not burn to obtain co-continuous fibrous carbon (step S4). Carbonization of cellulose nanofibers may be carried out by firing at 200° C. to 2000° C., more preferably at 600° C. to 1800° C., in an inert gas atmosphere. The gas that does not burn cellulose may be, for example, an inert gas such as nitrogen gas or argon gas. Further, the gas that does not burn cellulose may be a reducing gas such as hydrogen gas or carbon monoxide gas, or may be carbon dioxide gas. Carbon dioxide gas or carbon monoxide gas is more preferable since each has an activating effect on carbon materials and can be expected to cause highly activated.

A co-continuous fibrous carbon having a three-dimensional network structure is obtained by the production method described above.

Figure 2:
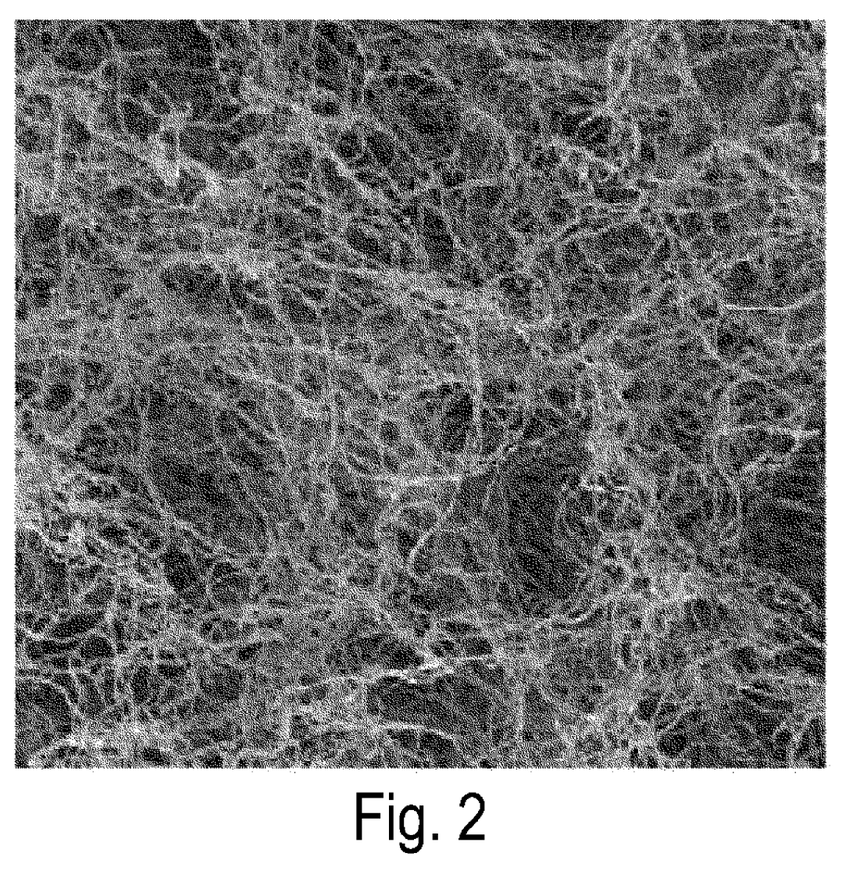
FIG. 2 is a scanning electron microscope (SEM) image of the co-continuous fibrous carbon produced by the production method of the first embodiment.

FIG. 2A is a scanning electron microscope (SEM) image of co-continuous fibrous carbon produced by the production method of the present embodiment. The magnification is 10000 times. The image shows that a three-dimensional network structure is constructed.

As described above, the co-continuous fibrous carbon of the present embodiment has a three-dimensional network structure in which the fibrous carbon is branched and co-continuous, unlike the carbon nanotubes in which aggregates are formed. Therefore, even when this co-continuous fibrous carbon is added to a solvent as a conductive filler, the branched structure suppresses the formation of bundles (aggregates), and the fibrous carbon can be uniformly dispersed while maintaining the conductive paths thereof.

If the fiber diameter of the co-continuous fibrous carbon is too small, the fibers are finely cut in the crushing step (step S5) described later, and the fibrous carbon aggregates in the mixing step (step S6) described later. Further, if the fiber diameter is too large, the conductive paste to be formed has decreased dispersibility, and the desired conductivity cannot be obtained. Therefore, the fiber diameter is preferably 10 nm to 200 nm.

Similarly, if the fiber length of the co-continuous fibrous carbon is too short, the fibrous carbon will aggregate in the mixing step (step S6) described later. If the fiber length of the co-continuous fibrous carbon is too long, the conductive paste to be formed has decreased dispersibility and the desired conductivity cannot be obtained. Therefore, the fiber length is preferably 300 nm to 2 μm. The fiber length described in this embodiment is defined as an average value of the lengths measured by observing the co-continuous fibrous carbon by SEM and tracing from one branched portion to the next branched portion (between adjacent branched portions). The number of measurement points is 500 or more.

In order to produce co-continuous fibrous carbon having a fiber diameter of 10 nm to 200 nm and a fiber length of 300 nm to 2 μm, the fiber diameter of the cellulose nanofibers used is preferably 20 nm to 400 nm and the fiber length is preferably 500 nm to 4 μm.

Normally, the cellulose nanofibers are thinned and shortened in the carbonizing step (step 4) due to decomposition, combustion, activation, and so forth as compared with those before carbonization. However, when cellulose nanofibers having a fiber diameter smaller than 20 nm are used, the fibers aggregate in the freezing step (step S2), and a dried cellulose nanofiber having a large fiber diameter is obtained in the subsequent drying step (step S3). Therefore, when cellulose nanofibers having a fiber diameter smaller than 20 nm are used, the fiber diameter of the obtained co-continuous fibrous carbon becomes larger than 200 nm.

Figure 3:
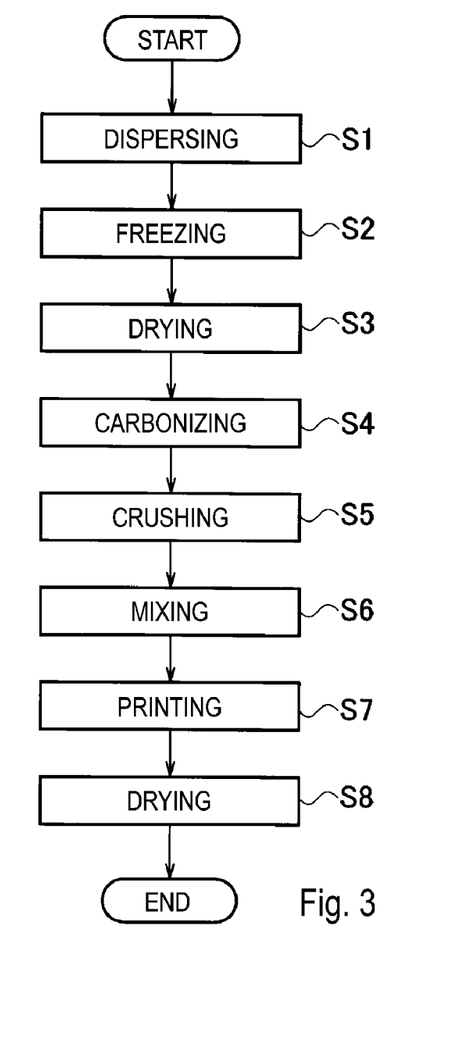
FIG. 3 is a flowchart depicting a method for producing a conductive paste according to the first embodiment and a conductive film formed from the conductive paste.

FIG. 3 is a flowchart depicting a conductive paste according to the first embodiment and a method for producing a conductive film formed from the conductive paste. The conductive paste of the present embodiment includes a conductive filler, a polymer, and a solvent, and the conductive filler includes co-continuous fibrous carbon having a three-dimensional network structure in which carbon is branched. In the production method illustrated in FIG. 3, the production method (steps S1 to S4) illustrated in FIG. 1 further includes a crushing step (step S5), a mixing step (step S6), a printing step (step S7), and a drying step (step S8). That is, in order to obtain the conductive paste and the conductive film of the present embodiment, the co-continuous fibrous carbon produced in steps S1 to S4 are subjected to steps S5 to S8.

In the crushing step, the co-continuous fibrous carbon carbonized in the above carbonization step (step S4) is crushed (step S5). In the crushing step, the co-continuous fibrous carbon is crushed into powder or slurry using, for example, a mixer, a homogenizer, an ultrasonic homogenizer, a high-speed rotary shear type stirrer, a colloid mill, a roll mill, a high-pressure injection disperser, a rotary ball mill, a vibrating ball mill, a planetary ball mill, or an attritor.

In this case, the co-continuous fibrous carbon preferably has a secondary particle size of 10 nm to 1 mm, and more preferably 1 μm to 50 μm. This is because, when crushed to a secondary particle size of 10 nm or less, the co-continuous structure is broken and it becomes difficult to obtain sufficient conductive paths. If the secondary particle size is too small, the fibrous carbon aggregates to form bundles, and a uniform conductive paste cannot be obtained. If the secondary particle size is 1 mm or more, the fibrous carbon does not form bundles, but the co-continuous fibrous carbon that functions as a conductive filler is not sufficiently dispersed, and it becomes difficult to maintain the desired conductivity after printing.

Further, the co-continuous fibrous carbon has a high porosity and a low density, and thus, if the co-continuous fibrous carbon is crushed by itself, the powder of the co-continuous fibrous carbon flies around during or after the crushing, making handling difficult. Therefore, it is preferable to impregnate the co-continuous fibrous carbon with a solvent and then crush the co-continuous fibrous carbon.

The solvent used here is not particularly limited, but includes, for example, organic solvents such as 3-methyl-3-methoxybutyl ether, 3-methyl-3-methoxybutanol, n-butanol, n-butylamine, n-methylpyrrolidone, acetone, isoamyl alcohol, isobutanol, isopropanol, ethanol, ethyl carbitol, ethylene glycol, ethylene glycol ethyl ether acetate, ethylene glycol butyl ether, octanol, carboxylic acid, diethylene glycol methyl ether, dipropylene glycol isopropyl ethyl ether, dipropylene glycol isopropyl methyl ether, dipropylene glycol ethyl ether, dipropylene glycol methyl ether, dodecane, tripropylene glycol methyl ether, propanol, propylene glycol ethyl ether acetate, propylene monomethyl ether, hexadecane, heptane, methanol, butyl acetate, butyl lactate, unsaturated fatty acids, and glycerol, and aqueous solvents such as water. Two or more of these solvents may be used in combination.

The solvent used here may be the solvent used for the conductive paste in step S6. In order to prevent the conductive paste from containing an unnecessary solvent, the solvent used here is more preferably the solvent used for the conductive paste.

In the mixing step, the material crushed in the crushing step (step S5) is mixed with the polymer and solvent used for the conductive paste to obtain a conductive paste (step S6). This polymer has the role of a binder, and is not particularly limited as long as it can bind the conductive fillers to each other and the conductive fillers to the substrate after the conductive paste is dried. Examples of the polymer include acrylic resins, alkyd resins, epoxy resins, styrene resins, phenol resins, butyral resins, unsaturated polyester resins, polyimide resins, polyurethane resins, polyester resins, methacrylic resins, melamine resins, urea resins, rubber resins, fluororesins, and cellulose derivatives. Two or more of these may be used in combination.

The solvent used for the conductive paste is not particularly limited, but includes, for example, an organic solvent such as 3-methyl-3-methoxybutyl ether, 3-methyl-3-methoxybutanol, n-butanol, n-butylamine, n-methylpyrrolidone, acetone, isoamyl alcohol, isobutanol, isopropanol, ethanol, ethyl carbitol, ethylene glycol, ethylene glycol ethyl ether acetate, ethylene glycol butyl ether, octanol, carboxylic acid, diethylene glycol methyl ether, dipropylene glycol isopropyl ethyl ether, dipropylene glycol isopropyl methyl ether, dipropylene glycol ethyl ether, dipropylene glycol methyl ether, dodecane, tripropylene glycol methyl ether, propanol, propylene glycol ethyl ether acetate, propylene monomethyl ether, hexadecane, heptane, methanol, butyl acetate, butyl lactate, unsaturated fatty acid, or glycerol, or an aqueous solvent such as water. Two or more of these solvents may be used in combination.

The mixing step may use, for example, a mixer, a homogenizer, an ultrasonic homogenizer, a high-speed rotary shear type stirrer, a colloid mill, a roll mill, a high-pressure injection disperser, a rotary ball mill, a vibrating ball mill, a planetary ball mill, an attritor, or a kneader.

The compounding ratio of the polymer is not particularly limited, but is generally 1% by mass to 50% by mass, more preferably 10% by mass to 40% by mass, of the conductive filler. Too little polymer may result in poor printing properties, and too much polymer may reduce conductivity.

The production method of the present embodiment does not have to include all the steps. For example, by adding the polymer and the solvent at the same time in the crushing step, the crushing and the mixing may be performed at the same time. In this case, the mixing step does not have to be performed.

A dispersant may be added to the conductive paste obtained in the mixing step. In this case, the dispersant may be a known one such as an anionic dispersant, a cationic dispersant, an amphoteric dispersant, and a nonionic dispersant.

The other ingredients are not particularly limited and may be appropriately selected according to the purpose, and examples thereof include surfactants, dispersion stabilizers, viscosity modifiers, leveling agents, and antifoaming agents.

In the printing step, the conductive paste mixed in the mixing step (step S6) is printed (coated) on a substrate by, for example, a screen printing method, an offset printing method, an inkjet printing method, a squeegee method, a doctor blade method, a photolithography method, or a nanoimprint method (step S7).

In the drying step, the conductive paste printed on the substrate is dried in a constant temperature bath, a dryer, natural drying, or the like to remove the solvent and form a conductive film (step S8). If the solvent can be removed, the drying temperature is not particularly limited, but the drying time can be shortened by heating at a temperature below the boiling point, flash point, and ignition point of the solvent used.

Figure 4:
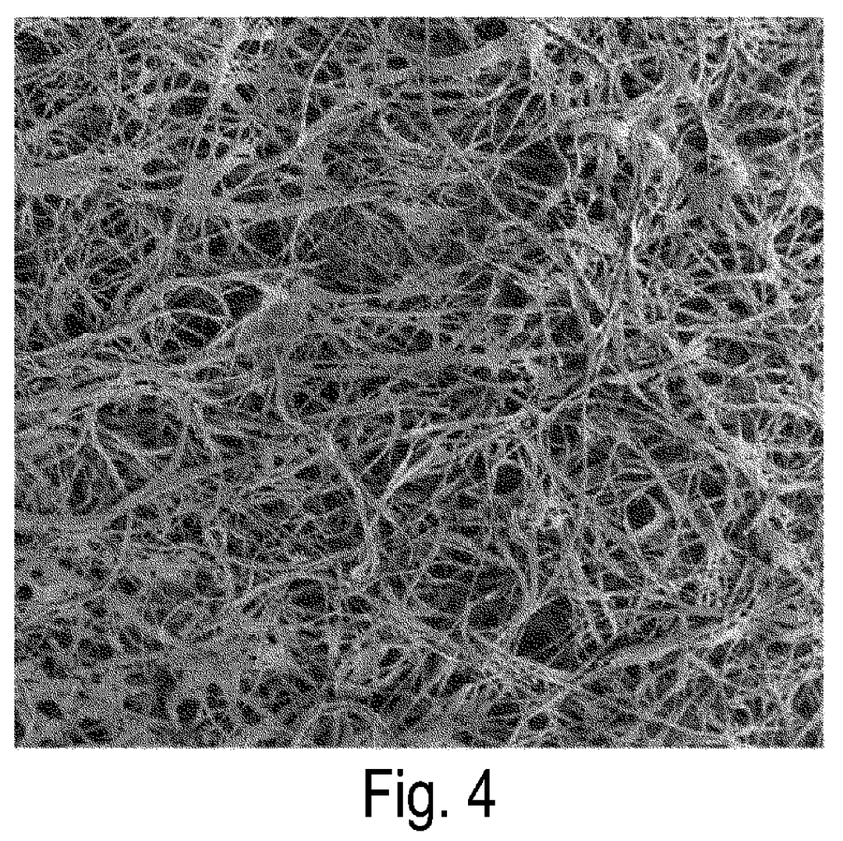
FIG. 4 is an SEM image of the conductive film formed from the conductive paste of the first embodiment.

FIG. 4 is an SEM image of the conductive film formed by the conductive paste of the present embodiment. The magnification is 10000 times. From the image, it can be seen that the three-dimensional network structure of carbon is maintained even in the form of the conductive film.

As described above, since the conductive film has a three-dimensional network structure even in the form of a conductive film, the conductive film maintains conductive paths between the fibrous carbons and has high conductivity. Furthermore, since the fibers are firmly connected to each other, the conductive film generally has the effect of being less likely to exhibit cracking that occur during solvent drying and being less likely to peel away from the substrate.

Second Embodiment

In the second embodiment, metal particles and/or carbon particles are added as a second conductive filler in the mixing step (step S6) to the first embodiment. That is, the conductive filler of the present embodiment includes at least one selected from metal particles and carbon powder in addition to co-continuous fibrous carbon.

When metal particles are used as a conductive filler, problems such as ion migration and deterioration of conductivity due to oxidation reaction occur, but when the amount added is 5% by mass to 70% by mass, more preferably 10% by mass to 50% by mass, of the co-continuous fibrous carbon which is the conductive filler, no major problem occurs and the conductivity is improved.

In addition, spherical and scaly carbon particles may also be used as the second conductive filler. By filling the gaps between the co-continuous fibrous carbons with the fine carbon particles, a more efficient electric conduction path can be formed and high conductivity can be exhibited. The amount of carbon particles added is preferably 5% by mass to 70% by mass, more preferably 10% by mass to 50% by mass, of the co-continuous fibrous carbon which is a conductive filler.

When metal particles and carbon particles are added as the second conductive filler, the total amount of the metal particles and the carbon particles added is preferably 5% by mass to 70% by mass, and more preferably 10% by mass to 50% by mass, of the co-continuous fibrous carbon which is the conductive filler.

The metal particles are not particularly limited, but include at least one selected from the group consisting of gold, silver, copper, platinum, nickel, titanium, iron, magnesium, aluminum, calcium, cobalt, zinc, gallium, germanium, zirconium, molybdenum, ruthenium, rhodium, palladium, cadmium, indium, tin, tantalum, tungsten, osmium, iridium, lead, vanadium, chromium, manganese, niobium, molybdenum, and technetium. Further, as the metal particles, one kind selected from these groups or two or more kinds may be mixed to use. Further, the metal particles may be an alloy formed from these, or may be a core-shell type alloy formed from these.

The carbon particles are not particularly limited, but include at least one selected from the group consisting of fullerenes, carbon nanotubes, graphene, graphite, and amorphous carbon. Further, as the carbon particles, one kind selected from these groups or two or more kinds may be mixed to use.

The second embodiment is the same as the first embodiment, except for that metal particles and/or carbon particles are added in addition to the polymer and solvent in the mixing step (step S6).

Experimental Examples of First Embodiment, Second Embodiment, and Comparative Examples For the purpose of confirming the effects of the first embodiment and the second embodiment described above, an experiment was carried out for comparing the conductive pastes produced by the production methods of the first embodiment and the second embodiment (Experimental Examples 1 to 7) with conductive pastes different from the above embodiments (Comparative Examples 1 to 3).

Experimental Example 1

Using cellulose nanofibers (average fiber diameter 40 nm, average fiber length 1 μm), 1 g of cellulose nanofibers, and 10 g of ultrapure water were stirred with a homogenizer (manufactured by SMT Co., Ltd.) for 12 hours to prepare a dispersion liquid of cellulose nanofibers, and the dispersion liquid was poured into a test tube.

The cellulose nanofiber dispersion liquid was completely frozen by immersing the test tube in liquid nitrogen for 30 minutes. After completely freezing the cellulose nanofiber dispersion liquid, the frozen cellulose nanofiber dispersion liquid was taken out on a chalet and dried in a vacuum of 10 Pa or less by a freeze dryer (manufactured by Tokyo Rikakikai Co., Ltd.) for 24 hours, whereby a dried product of cellulose nanofibers was obtained. After drying in vacuum, the cellulose nanofibers were carbonized by firing at 600° C. for 2 hours in a nitrogen atmosphere, whereby the co-continuous fibrous carbon of Experimental Example 1 was prepared. The co-continuous fibrous carbon produced in this experimental example was observed by SEM, and was confirmed to have an average fiber diameter of 20 nm and an average fiber length of 500 nm.

The produced co-continuous fibrous carbon was impregnated with n-methylpyrrolidone (NMP), and the co-continuous fibrous carbon, a polyester solution, and NMP (weight ratio between co-continuous fibrous carbon, polyester resin, and NMP was 7:3:90) were stirred with a homogenizer (manufactured by SMT Co., Ltd) for 12 hours for crushing and mixing. The conductive paste produced by this method was printed on a PET sheet by a screen printing method and cured in an air atmosphere at 80° C. for 1 hour to obtain a conductive film. The conductive film produced in this experimental example was observed by SEM, and was confirmed to have an average secondary particle size of 25 μm.

Experimental Example 2

A conductive paste was prepared by adding silver powder as a second conductive filler to the conductive paste prepared in Experimental Example 1.

Specifically, co-continuous fibrous carbon was prepared in the same manner as in Experimental Example 1, impregnated with n-methylpyrrolidone (NMP), and the co-continuous fibrous carbon, silver powder, a polyester solution, and NMP (weight ratio between co-continuous fibrous carbon, silver powder, polyester resin, and NMP was 5:2:3:90) were stirred with a homogenizer (manufactured by SMT Co., Ltd) for 12 hours for crushing and mixing. The conductive paste produced by this method was printed on a PET sheet by a screen printing method in the same manner as in Experimental Example 1, and cured in an air atmosphere at 80° C. for 1 hour to obtain a conductive film.

The silver powder used in this experimental example had a particle size of 0.1 µm and a single resistivity of $1.6 \times 10^{-6}$ Ω·cm.

Experimental Example 3

A conductive paste was prepared by adding carbon powder as a second conductive filler to the conductive paste prepared in Experimental Example 1.

Specifically, co-continuous fibrous carbon was prepared in the same manner as in Experimental Example 1, impregnated with n-methylpyrrolidone (NMP), and the co-continuous fibrous carbon, carbon powder (Ketjenblack), a polyester solution, and NMP (weight ratio between co-continuous fibrous carbon, Ketjenblack, polyester resin, and NMP was 5:2:3:90) were stirred with a homogenizer (manufactured by SMT Co., Ltd) for 12 hours for crushing and mixing. The Ketjenblack used in this experimental example had a particle size of 35 nm, a specific surface area of 1300 m2/g, and a hollow shell-like structure.

The conductive paste produced by this method was printed on a PET sheet by a screen printing method in the same manner as in Experimental Example 1, and cured in an air atmosphere at 80° C. for 1 hour to obtain a conductive film.

Experimental Example 4

A conductive paste was prepared by adding silver powder and carbon powder as second conductive fillers to the conductive paste prepared in Experimental Example 1.

Specifically, co-continuous fibrous carbon was prepared in the same manner as in Experimental Example 1, impregnated with n-methylpyrrolidone (NMP), and the co-continuous fibrous carbon, silver powder, carbon powder (Ketjenblack), a polyester solution, and NMP (weight ratio between co-continuous fibrous carbon, silver powder, Ketjenblack, polyester resin, and NMP was 5:1:1:3:90) were stirred with a homogenizer (SMT Co., Ltd.) for 12 hours for crushing and mixing. The silver powder and Ketjenblack used in this experimental example are of the same type as the silver powder and Ketjenblack used in Experimental Examples 2 and 3.

The conductive paste produced by this method was printed on a PET sheet by a screen printing method in the same manner as in Experimental Example 1, and cured in an air atmosphere at 80° C. for 1 hour to obtain a conductive film.

Experimental Example 5

Experimental Example 5 is a conductive paste including co-continuous fibrous carbon having a large fiber diameter and a long fiber length, which was prepared by using the same cellulose nanofibers as the raw material of Experimental Example 1 except for having a large fiber diameter and a long fiber length.

Specifically, a conductive paste was prepared in the same manner as in Experimental Example 1 except that cellulose nanofibers having an average fiber diameter of 700 nm and an average fiber length of 5 µm were used instead of the cellulose nanofibers of Experimental Example 1 as the raw material. The co-continuous fibrous carbon produced in this experimental example was observed by SEM, and was confirmed to have an average fiber diameter of 300 nm and an average fiber length of 3 µm.

The conductive paste produced by this method was printed on a PET sheet by a screen printing method in the same manner as in Experimental Example 1, and cured in an air atmosphere at 80° C. for 1 hour to obtain a conductive film.

Experimental Example 6

Experimental Example 6 is a conductive paste including co-continuous fibrous carbon having a small fiber diameter and a short fiber length, which was prepared by using the same cellulose nanofibers as the raw material of Experimental Example 1 except for having a small fiber diameter and a short fiber length.

Specifically, a conductive paste was prepared in the same manner as in Experimental Example 1 except that cellulose nanofibers having an average fiber diameter of 15 nm and an average fiber length of 400 nm were used instead of the cellulose nanofibers of Experimental Example 1 as the raw material. The co-continuous fibrous carbon produced in this experimental example was observed by SEM, and was confirmed to have an average fiber diameter of 8 nm and an average fiber length of 200 nm.

The conductive paste produced by this method was printed on a PET sheet by a screen printing method in the same manner as in Experimental Example 1, and cured in an air atmosphere at 80° C. for 1 hour to obtain a conductive film.

Experimental Example 7

Experimental Example 7 is a conductive paste including co-continuous fibrous carbon having a small secondary particle size, which was prepared by finely crushing the co-continuous fibrous carbon before the crushing and mixing steps by the homogenizer of Experimental Example 1.

Specifically, isopropanol was added to the co-continuous fibrous carbon produced in the same manner as in Experimental Example 1, crushed with a ball mill for 1 week, and dried at 80° C., and the obtained product was used as a conductive filler. A conductive paste was prepared in the same manner as in Experimental Example 1 except that a crushing step using a ball mill was added. The co-continuous fibrous carbon produced in this experimental example after crushing was observed by SEM, and was confirmed to have a secondary particle size of 900 nm.

The conductive paste produced by this method was printed on a PET sheet by a screen printing method in the same manner as in Experimental Example 1, and cured in an air atmosphere at 80° C. for 1 hour to obtain a conductive film.

Comparative Example 1

Comparative Example 1 is a conductive paste in which silver powder is used as the conductive filler instead of co-continuous fibrous carbon.

In Comparative Example 1, silver powder, a polyester solution, and NMP (weight ratio between silver powder, polyester resin, and NMP was 7:3:90) were stirred with a homogenizer (manufactured by SMT Co., Ltd.) for 12 hours for crushing and mixing. The silver powder used in this comparative example is of the same type as the silver powder used in Experimental Example 2.

The conductive paste produced by this method was printed on a PET sheet by a screen printing method in the same manner as in Experimental Example 1, and cured in an air atmosphere at 80° C. for 1 hour to obtain a conductive film.

Comparative Example 2

Comparative Example 2 is a conductive paste in which carbon powder is used as the conductive filler instead of co-continuous fibrous carbon.

In Comparative Example 2, carbon powder (Ketjenblack), a polyester solution, and NMP (weight ratio between Ketjenblack, polyester resin, and NMP was 7:3:90) were stirred with a homogenizer (manufactured by SMT Co., Ltd.) for 12 hours for crushing and mixing. The Ketjenblack used in this experimental example is the same type as the Ketjenblack used in Experimental Example 3.

The conductive paste produced by this method was printed on a PET sheet by a screen printing method in the same manner as in Experimental Example 1, and cured in an air atmosphere at 80° C. for 1 hour to obtain a conductive film.

Comparative Example 3

Comparative Example 3 is a conductive paste in which silver powder and carbon powder are used for the above-mentioned conductive filler instead of co-continuous fibrous carbon.

In Comparative Example 3, silver powder, carbon powder (Ketjenblack), a polyester solution, and NMP (weight ratio between silver powder, Ketjenblack, polyester resin, and NMP was 3.5:3.5:3:90) were stirred with a homogenizer (manufactured by SMT Co., Ltd.) for 12 hours for crushing and mixing. The silver powder and Ketjenblack used in this experimental example are of the same type as the silver powder and Ketjenblack used in Experimental Examples 2 and 3.

The conductive paste produced by this method was printed on a PET sheet by a screen printing method in the same manner as in Experimental Example 1, and cured in an air atmosphere at 80° C. for 1 hour to obtain a conductive film.

The various conductive films obtained in the above experimental examples and comparative examples were evaluated by performing resistivity measurement, sulfurization test, ion migration test, and visual observation of the surface state.

In the resistivity measurement, the volume resistivity was measured by the four-probe method (Lorester AX MCP-T370 manufactured by Mitsubishi Chemical Analytech Co., Ltd.). In the ion migration test, a voltage of 12 V was continuously applied to the conductive film printed with a pattern line spacing of 0.5 mm for 1000 hours in an environment having a temperature of 50° C. and a humidity of 90% to evaluate whether or not a short circuit occurred between circuits. In the sulfurization test, a gauze soaked in water was placed on a conductive film in an environment having a temperature of 50° C., a humidity of 70%, and hydrogen sulfide of 4 ppm, and the volume resistivity after 1000 hours was measured.

For visual observation of the surface condition, whether or not cracks appeared in the conductive film was examined, and the adhesion strength between the conductive fillers contained in the conductive paste was examined.

Table 1 gives the evaluation values obtained by these measurements.

As given in Table 1, the conductive films of the first and second embodiments (Experimental Examples 1, 2, 3, and 4) have higher conductivity than Comparative Example 2 in which carbon powder is used as the conductive filler.

This is because the conductive paths between the fibrous carbons are maintained by using the co-continuous fibrous carbon as the conductive filler.

Further, the conductive film of the second embodiment (Experimental Examples 2, 3 and 4) has higher conductivity than the conductive film of the first embodiment (Experimental Example 1).

This is because the addition of the metal powder and/or the carbon powder as the second conductive filler allows the powdery conductive filler to enter between the fibrous carbons, and thus the conductive paths are formed more efficiently.

Experimental Example 1 has higher conductivity than Experimental Examples 5, 6, and 7. This is because the co-continuous fibrous carbon of Experimental Example 1 has the fiber diameter of 10 nm to 200 nm, the fiber length of 300 nm to 2 μm, and the secondary particle size of 1 μm to 50 μm, and thus the co-continuous structure is maintained and the dispersibility is high even after the crushing and mixing steps.

In Comparative Examples 1 and 3, although the resistivity was low immediately after the conductive film was formed, it was confirmed that the resistivity was significantly increased by the sulfurization of the metal after the sulfurization test. On the other hand, in the conductive film using co-continuous fibrous carbon (Experimental Examples 1 to 7), the influence of sulfurization is small.

In addition, in Comparative Examples 1 and 3, short circuits between the circuits were confirmed after the ion migration test. In Experimental Example 2, a metal powder is used as the second conductive filler but the metal content is small, which is likely the reason for the small effect of sulfidation and ion migration.

In the visual observation of the surface state, the conductive paste using the co-continuous fibrous carbon had no cracks, while Comparative Examples 1, 2, and 3 had cracks. This is because the conductive filler of the conductive film using the co-continuous fibrous carbon (Experimental Examples 1 to 7) has a three-dimensional network structure and the fibrous carbons are firmly connected to each other, and thus the conductive fillers have high adhesion to each other.

TABLE 1

| EXPERIMENTAL EXAMPLE/ COMPARATIVE EXAMPLE | RESISTIVITY (IMMEDIATELY AFTER FORMING CONDUCTIVE FILM) | RESISTIVITY (AFTER SULFURIZATION TEST) | PRESENCE OF SHORT CIRCUIT (AFTER ION MIGRATION TEST) | SURFACE STATE |
|---|---|---|---|---|
| EXPERIMENTAL EXAMPLE 1 | $8.5 \times 10^{-3}$ Ω·cm | $7.9 \times 10^{-3}$ Ω·cm | NO SHORT CIRCUIT | NO CRACKS |
| EXPERIMENTAL EXAMPLE 2 | $9.0 \times 10^{-4}$ Ω·cm | $9.8 \times 10^{-3}$ Ω·cm | NO SHORT CIRCUIT | NO CRACKS |
| EXPERIMENTAL EXAMPLE 3 | $2.8 \times 10^{-3}$ Ω·cm | $2.2 \times 10^{-3}$ Ω·cm | NO SHORT CIRCUIT | NO CRACKS |
| EXPERIMENTAL EXAMPLE 4 | $1.1 \times 10^{-3}$ Ω·cm | $2.9 \times 10^{-3}$ Ω·cm | NO SHORT CIRCUIT | NO CRACKS |
| EXPERIMENTAL EXAMPLE 5 | $6.4 \times 10^{-1}$ Ω·cm | $6.0 \times 10^{-1}$ Ω·cm | NO SHORT CIRCUIT | NO CRACKS |
| EXPERIMENTAL EXAMPLE 6 | $7.5 \times 10^{-2}$ Ω·cm | $7.1 \times 10^{-2}$ Ω·cm | NO SHORT CIRCUIT | NO CRACKS |
| EXPERIMENTAL EXAMPLE 7 | $7.9 \times 10^{-2}$ Ω·cm | $7.2 \times 10^{-2}$ Ω·cm | NO SHORT CIRCUIT | NO CRACKS |
| COMPARATIVE EXAMPLE 1 | $1.3 \times 10^{-4}$ Ω·cm | $1.0 \times 10^{8}$ Ω·cm OR MORE | SHORT CIRCUIT | CRACKS |
| COMPARATIVE EXAMPLE 2 | $2.4 \times 10^{2}$ Ω·cm | $1.9 \times 10^{2}$ Ω·cm | NO SHORT CIRCUIT | CRACKS |
| COMPARATIVE EXAMPLE 3 | $5.6 \times 10^{-1}$ Ω·cm | $2.3 \times 10^{5}$ Ω·cm | SHORT CIRCUIT | CRACKS |

The conductive paste of the present embodiment described above includes a conductive filler, a polymer, and a solvent, the conductive filler including co-continuous fibrous carbon having a three-dimensional network structure in which fibrous carbon is branched.

By using co-continuous fibrous carbon having a three-dimensional network structure as the conductive filler, the fibrous carbon is uniformly dispersed in the dispersion medium without forming bundles. In the present embodiment, by uniformly dispersing the fibrous carbon in the dispersion medium, it is possible to provide a highly conductive and inexpensive conductive paste that does not easily cause ion migration and oxidation reaction.

In the conductive film of the present embodiment formed by drying the conductive paste on a substrate after printing, fibrous carbon maintains a conductive path even after the formation. As a result, in the present embodiment, it is possible to provide a highly conductive and inexpensive conductive film that does not easily cause ion migration and oxidation reaction.

The conductive pastes of the first and second embodiments may include naturally derived cellulose as a raw material, and thus have an extremely low environmental impact. Since conductive films formed from such conductive pastes are easily disposable in daily life, they can be effectively used in various situations such as small devices, sensor terminals, medical equipment, batteries, beauty appliances, fuel cells, biofuel cells, microbial batteries, capacitors, catalysts, solar cells, semiconductor production processes, filters, heat resistant materials, flame resistant materials, heat insulating materials, conductive materials, electromagnetic wave shield materials, electromagnetic wave noise absorbents, heating elements, microwave heating elements, cone paper, clothes, carpet, mirror anti-fog materials, sensors, and touch panels.

REFERENCE SIGNS LIST

S1 Dispersing step
S2 Freezing step
S3 Drying step
S4 Carbonizing step
S5 Crushing step
S6 Drying step
S7 Printing step
S8 Drying step

The invention claimed is:

1. A method for producing a conductive film, comprising:
   crushing co-continuous fibrous carbon having a three-dimensional network structure in which the fibrous carbon is branched, at least a portion of the crushed co-continuous fibrous carbon having a fiber diameter of 10 nm to 200 nm, a fiber length of 300 nm to 2 µm, and a secondary particle size of 1 µm to 50 µm, the co-continuous fibrous carbon being comprised of carbonized cellulose fibers;
   mixing the crushed co-continuous fibrous carbon, a polymer, and a solvent to obtain a conductive paste;
   printing the conductive paste on a substrate; and
   drying the conductive paste to remove the solvent to obtain the conductive film,
   wherein crushing the co-continuous fibrous carbon comprises impregnating the co-continuous fibrous carbon with a solvent and then crushing the co-continuous fibrous carbon impregnated with the solvent.

2. A method for producing a conductive film, comprising:
   carbonizing cellulose fibers to obtain co-continuous fibrous carbon having a three-dimensional network structure in which the fibrous carbon is branched;
   crushing the co-continuous fibrous carbon, at least a portion of the crushed co-continuous fibrous carbon having a fiber diameter of 10 nm to 200 nm, a fiber length of 300 nm to 2 µm, and a secondary particle size of 1 µm to 50 µm;
   mixing the crushed co-continuous fibrous carbon, a polymer, and a solvent to obtain a conductive paste;
   printing the conductive paste on a substrate; and
   drying the conductive paste to remove the solvent to obtain the conductive film,
   wherein crushing the co-continuous fibrous carbon comprises impregnating the co-continuous fibrous carbon with a solvent and then crushing the co-continuous fibrous carbon impregnated with the solvent.

3. The method as recited in claim 2, wherein prior to carbonizing the cellulose fibers:
- freezing a dispersing liquid containing the cellulose fibers; and
- drying the frozen dispersing liquid containing the cellulose fibers so as to separate the cellulose fibers from the dispersion liquid.

* * * * *